United States Patent
Hsiao

(10) Patent No.: US 10,296,081 B2
(45) Date of Patent: May 21, 2019

(54) AUGMENTED REALITY MAN-MACHINE INTERACTIVE SYSTEM

(71) Applicant: MING CHUAN UNIVERSITY, Taipei (TW)

(72) Inventor: Kuei-Fang Hsiao, Taoyuan (TW)

(73) Assignee: Ming Chuan University, Taipei (TW)

(*) Notice: Subject to any disclaimer, the term of this patent is extended or adjusted under 35 U.S.C. 154(b) by 0 days.

(21) Appl. No.: 15/687,725

(22) Filed: Aug. 28, 2017

(65) Prior Publication Data
US 2019/0033958 A1    Jan. 31, 2019

(30) Foreign Application Priority Data
Jul. 26, 2017 (TW) .............................. 106125046 A

(51) Int. Cl.
| | |
|---|---|
| *G06F 3/033* | (2013.01) |
| *G06F 3/01* | (2006.01) |
| *G06T 7/90* | (2017.01) |
| *G06F 3/03* | (2006.01) |
| *G09B 5/02* | (2006.01) |

(52) U.S. Cl.
CPC ............ *G06F 3/011* (2013.01); *G06F 3/0304* (2013.01); *G06T 7/90* (2017.01); *G09B 5/02* (2013.01)

(58) Field of Classification Search
CPC ........ H04N 13/04; H04N 13/00; H04N 13/02; H04N 9/75; G02B 27/01; G09G 3/20; G09G 5/30; G09G 5/02; G09G 5/08; G06F 3/033; A63F 13/213; A63F 13/22; A63F 13/24; A63F 13/843; A63F 13/428; A63F 13/06; A63F 13/21; G06T 7/11; G06T 7/20; G06T 7/70; G01B 11/14
See application file for complete search history.

(56) References Cited

U.S. PATENT DOCUMENTS

| | | | | |
|---|---|---|---|---|
| 9,724,597 | B2 * | 8/2017 | Mikhailov | .............. A63F 13/04 |
| 9,921,052 | B2 * | 3/2018 | Ikenoue | ................... A63F 13/06 |
| 2010/0303297 | A1 * | 12/2010 | Mikhailov | ............... H04N 9/75 |
| | | | | 382/103 |
| 2011/0034244 | A1 * | 2/2011 | Marks | ..................... A63F 13/02 |
| | | | | 463/30 |
| 2012/0249422 | A1 * | 10/2012 | Tse | .......................... G06F 3/017 |
| | | | | 345/158 |

(Continued)

*Primary Examiner* — Pegeman Karimi
(74) *Attorney, Agent, or Firm* — Rosenberg, Klein & Lee

(57) ABSTRACT

An augmented reality man-machine interactive system includes a processing device for defining an interactive object image and a controllable object image and setting a color identification value, and an image capturing device for capturing an image for the processing device. The processing device defines the range of the image having the color block as a characteristic region when the image has a color block with the color identification value and makes the controllable object image to be dependent and controllable by the characteristic region. Therefore, the present invention uses a label object of the color identification value to define a characteristic region without requiring any expensive image identification and computing device, so as to operate and control the controllable object image and interact with the interactive object image. The system is applicable for augmented reality of daily life or classroom teaching.

10 Claims, 3 Drawing Sheets

(56) References Cited

U.S. PATENT DOCUMENTS

2015/0209664 A1\* 7/2015 Haseltine ................ A63F 13/00
 463/31
2016/0151705 A1\* 6/2016 Ji ....................... H04N 21/4223
 463/29

\* cited by examiner

AUGMENTED REALITY MAN-MACHINE INTERACTIVE SYSTEM

FIELD OF INVENTION

The present invention relates to an augmented reality man-machine interactive system, in particular to the system that defines a characteristic region by identifying colors in augmented reality, so as to carry out the interaction by operating and controlling a controllable object image and an interactive object image.

BACKGROUND OF INVENTION

1. Description of the Related Art

Augmented Reality (AR) is the technology of computing the position and angle of a camera by field computing to show images, and it is used extensively in different areas such as satellites, mobile devices, medical surgeries, different industries, and entertainments.

Compared with traditional teaching, augmented reality, Internet of Things (IoT) and related equipments such as a projector, a smartphone and a personal computer are integrated with places such as a classroom to show a clearer and vivid augmented reality image and allow users to perform interactions, so as to promote the learning efficiency of students.

As to augmented reality interactions, expensive equipments such as Kinect are usually used to identify a user's skeleton or computers with high computation capability are used to identify a portrait to trace its position and action, so that a user can interact with a movable object defined by augmented reality. In regions or areas such as developing countries with less information resources or constructions, the fund for setting up augmented reality related equipments is limited, and thus it is difficult for these developing countries to afford expensive augmented reality equipments, and the learning efficiency of students in these countries cannot be improved, and related social problems such as uneven teaching source distribution or widened gap between urban and rural areas, etc may arise.

In view of the aforementioned problems, the inventor of the present invention conducted extensive research and development on augmented reality interactions, in hope of providing a feasible solution to overcome the aforementioned problems.

2. Summary of the Invention

Therefore, it is a primary objective of the present invention to overcome the aforementioned drawbacks and problems by provide an augmented reality man-machine interactive system, comprising: an image capturing device, for capturing an image; a processing device, coupled to the image capturing device, and having at least one interactive object image and at least one controllable object image defined therein and a plurality of interactive states set therein, and the controllable object image having at least one interactive instruction, and the interactive object image being dependent and controllable by the interactive instruction to switch the interactive state; and the processing device having at least one color identification value; the processing device analyzing an image captured by the image capturing device, and when the image captured by the image capturing device has a color block corresponsive to the color identification value, the range of the image having the color block is defined as a characteristic region, such that the controllable object image is dependent and controllable the characteristic region, and at least one of the interactive instructions is executed according to the characteristic region; and a projection device, coupled to the processing device, and the processing device projecting the interactive object image, the controllable object image and the characteristic region.

The augmented reality man-machine interactive system further comprises at least one label object, and the label object having at least one color corresponsive to the color identification value, and the image capturing device capturing an image of the label object, so that the processing device defines the characteristic region.

In the augmented reality man-machine interactive system, the label object is a wearable object.

In the augmented reality man-machine interactive system, the processing device corrects the light intensity of the image according to the ambient light intensity before analyzing whether or not the image has the color block of the color identification value, when the processing device receives the image captured by the image capturing device.

In the augmented reality man-machine interactive system, the controllable object image is an image of a user.

In the augmented reality man-machine interactive system, the processing device defines the interactive instruction according to an overlap of at least one of the characteristic regions and at least one of the interactive object images.

In the augmented reality man-machine interactive system, the processing device is a computer, a tablet PC, or a smart device.

In the augmented reality man-machine interactive system, the image capturing device is a camera device of a smartphone.

In the augmented reality man-machine interactive system, the projection device projects an augmented reality image.

In the augmented reality man-machine interactive system, the processing device, the image capturing device and the projection device make a signal link among each other via Internet, local area network or Bluetooth.

In summation of the description above, the present invention has the following advantages and effects:

The present invention defines a color identification value and uses an image captured by the mage capturing device and having the color identification value as a characteristic region to execute an interactive instruction. When a user wears a label object having the corresponding color identification value, the label object may interact with the interactive object image, and thus the present invention may be used for analyzing, identifying, and tracing a user without requiring expensive equipments or complicated computations in order to identify a user's position and action, and a user may interact with the controllable object image, and the interaction will not be delayed by the complicated computations. When there are more than one user, the users may wear label objects with different color identification values, so that a group of users may interact with the interactive object image, and the present invention becomes especially important in group interactions or competitions of group teaching. Obviously, the present invention has the features of simple equipment, low cost, powerful function and fast computation.

DESCRIPTION OF THE PREFERRED EMBODIMENTS

The above and other objects, features and advantages of this disclosure will become apparent from the following detailed description taken with the accompanying drawings. It is intended that the embodiments and drawings disclosed herein are to be considered illustrative rather than restrictive.

Figure 1:
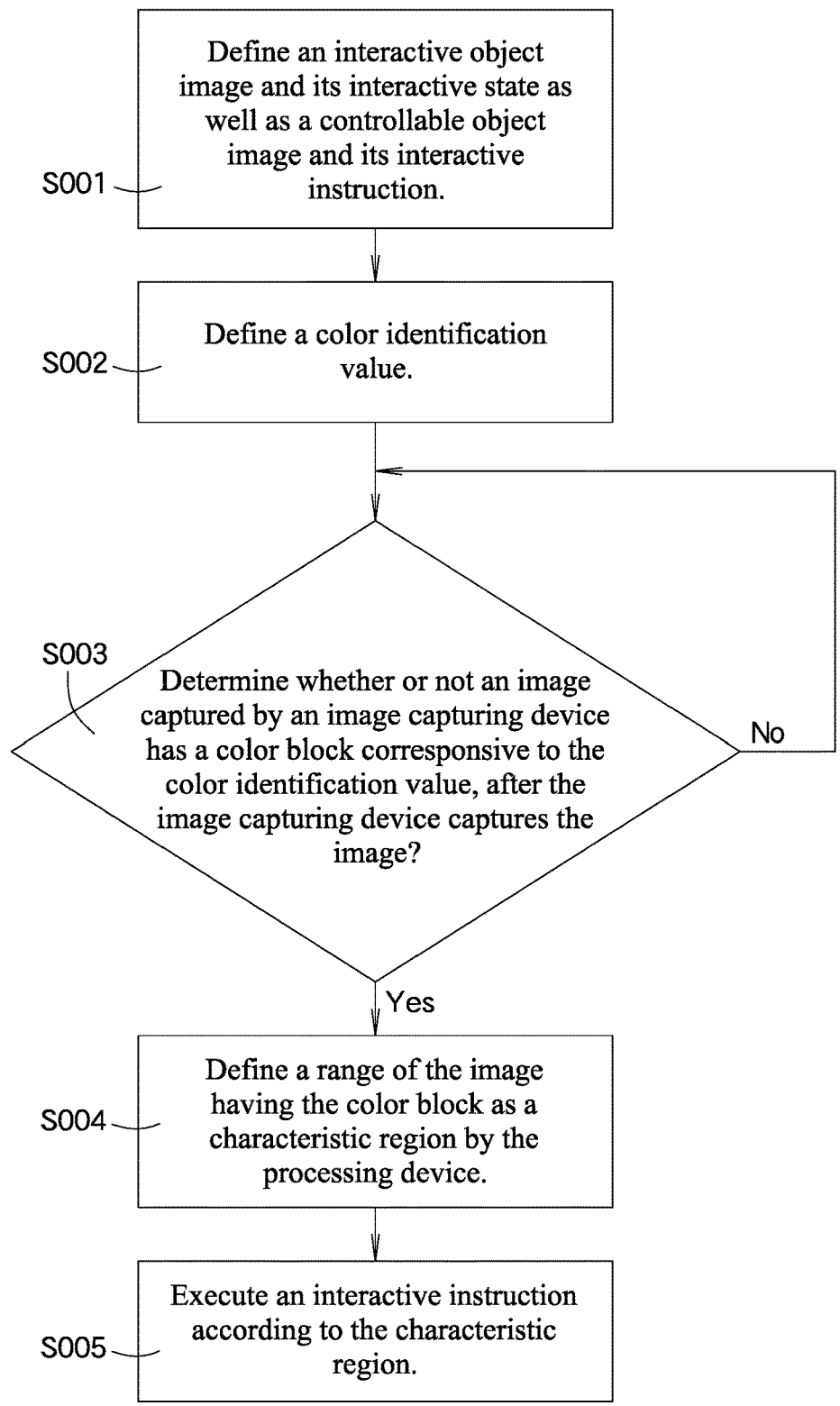
FIG. 1 is a flow chart of the present invention.
Figure 2:
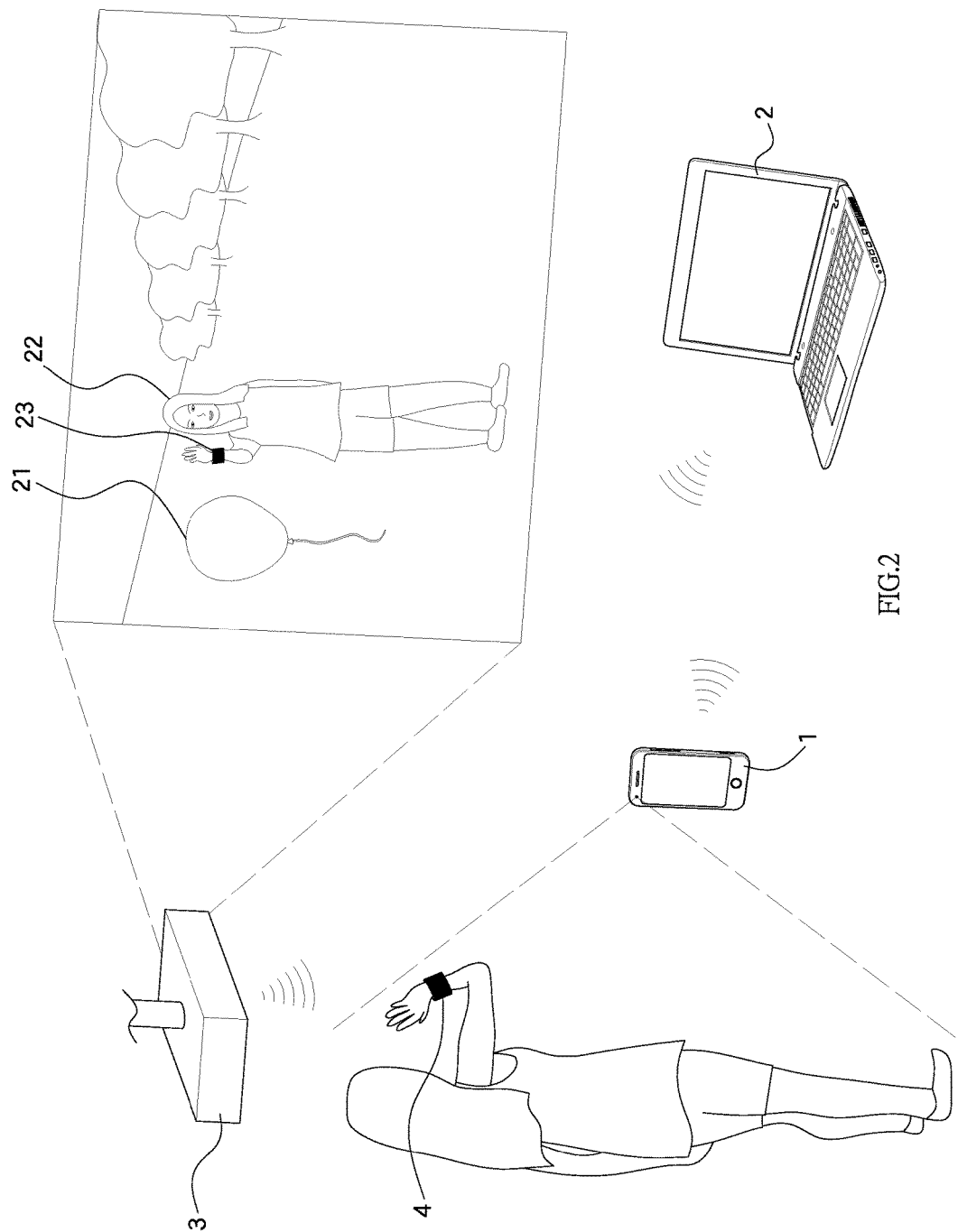
FIG. 2 is a schematic view of a using status of the present invention.

With reference to FIGS. 1 and 2 for an augmented reality man-machine interactive system of the present invention, the augmented reality man-machine interactive system comprises the following elements:

An image capturing device 1 is provided for capturing an image, wherein the image capturing device 1 of an embodiment includes but not limited to a camera device or a smartphone.

A processing device 2 is a computing device such as a computer, a tablet PC or a smart device in an embodiment for executing an augmented reality algorithm, wherein the processing device 2 defines at least one interactive object image 21 and at least one controllable object image 22; the interactive object image 21 has a setting of a plurality interactive states, and the interactive state specifically indicates the state of the interactive object image 21; the controllable object image 22 has at least one interactive instruction; and the processing device 2 sets at least one color identification value; the processing device 2 analyzes the image captured by the image capturing device 1, and when the image captured by the image capturing device 1 has a color block corresponsive to the color identification value, the range of the image having the color block is defined as the characteristic region 23, and the controllable object image 22 is dependent and controllable by the characteristic region 23, and at least one of the interactive instruction is executed according to the characteristic region 23; and in this preferred embodiment, the processing device 2 defines the interactive instruction according to an overlap between at least one of the characteristic regions 23 and at least one of the interactive object images 21.

A projection device 3 is coupled to the processing device 2, and the processing device 2 projects the interactive object image 21, the controllable object image 22 and the characteristic region 23. In a preferred embodiment, the projection device 3 projects an augmented reality image.

In an embodiment, the connection among the processing device 2, the image capturing device 1 and the projection device 3 make a signal link via Internet, local area network or Bluetooth. However, the aforementioned arrangement is intended for illustrating the present invention only, but not intended for limiting the scope of the invention.

In an embodiment of the present invention, the augmented reality man-machine interactive system carries out a procedure comprising the following steps:

S001: Define an interactive object image 21 and a controllable object image 22, wherein the controllable object image 22 may be an object image corresponsive to a user's movement, and the interactive object image 21 is controlled by an interactive instruction executed by the controllable object image 22 to change its interactive state, wherein the controllable object image 22 in an embodiment may be defined as a user's image and created by capturing an image by the image capturing device 1, and the interactive object image 21 may be defined according to the purpose of use. For example, the interactive object image 21 may be set as an image of a teaching tool in a teaching environment. For example, an image of a plant or an animal may be used as an object image interactive with the users.

S002: Define a color identification value, so that the processing device 2 can select a required tracking target in the image. The color identification value is defined preferably by specific numeric values or interval of limits. For example, in the RGB color space, the color identification value of (255,0,0) is defined as pure red color, or the color identification value of (0,0,255) is defined as pure blue color in order to prevent interference of similar color. However, these values are used for the purpose of illustrating the invention only, but not intended to limit the scope of the invention.

In Steps S001 and S002, the interactive object image 21, the controllable object image 22 and the color identification value are defined in advance by an application program installed in the processing device 2, so that the installation of software is completed.

S003: Capture an image by the image capturing device 1, and transmit the image to the processing unit, and then the processing device 2 analyzes the image captured by the image capturing device 1 and determines whether or not the image captured by the image capturing device 1 has a color block corresponsive to the color identification value. If the captured image does not have a color block corresponsive to the color identification value, another image will be captured and analyzed continuously.

S004: Define the range of an image having the color block as a characteristic region 23 by the processing device 2 when the image has a color block corresponsive to the color identification value. In other words, the range of the image having the color block is defined as the characteristic region 23. In a preferred embodiment, the system further comprises at least one label object 4 to facilitate the capture of the characteristic region 23, wherein the label object 4 has at least one color corresponsive to the color identification value, and the image capturing device 1 captures the image of the label object 4, so that the processing device 2 defines the characteristic region 23. Preferably, the label object 4 is a wearable object such as a hat, clothing or a wristband to facilitate its wearing by the user. In this embodiment as shown in FIG. 2, a user wears the label object 4 at his/her wrist. However, the aforementioned arrangement is intended for illustrating the present invention only, but not intended for limiting the scope of the invention.

It is noteworthy that the augmented reality man-machine interactive system of the present invention may be used by a plurality of users, and the processing device 2 has a plurality of color identification values, and the different label objects 4 may have the same or different color to facilitate the classification and grouping.

However, the color may be affected by the light intensity of an ambient light source very easily, so that after the processing device 2 of a preferred embodiment of the invention has received an image captured by the image capturing device 1, the light intensity of the image is corrected according to the ambient light intensity before analyzing whether or not the image has a color block corresponsive to the color identification value.

S005: The processing unit makes the controllable object image 22 to be dependent and controllable by the characteristic region 23 and executes at least one of the interactive instruction according to the characteristic region 23. In an embodiment, the processing device 2 defines the interactive instruction according to an overlap between at least one of the characteristic regions 23 and at least one of the interactive object images 21. In other words, when one of the characteristic regions 23 is overlapped with one of the interactive object images 21, an interactive instruction is produced, and one of the interactive object image 21 changes its interactive state, wherein the interactive state refers to a specific expression state of the interactive object image 21 such as a change of position, movement, appearance or color, so as to achieve the interactive effect. However, the aforementioned arrangement is provided for the purpose of illustrating the present invention only, but not intended for limiting the scope of the invention.

Figure 3:
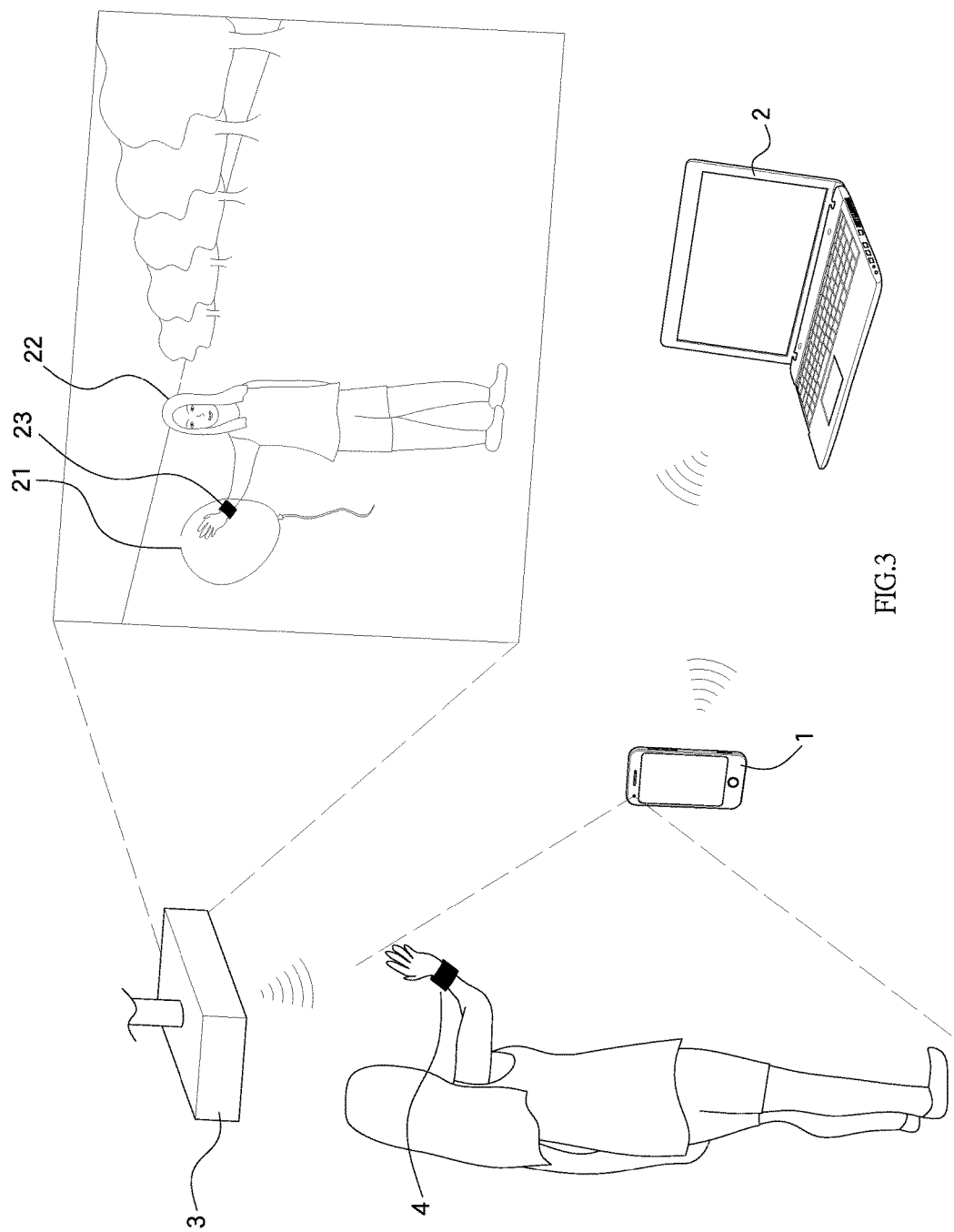
FIG. 3 is a schematic view of a using status that drives an interactive object image into an interactive state in accordance with the present invention.

In an embodiment as shown in FIGS. 2 and 3, the controllable object image 22 and characteristic region 23 projected by the projection device 3 is moved according to the movement of the label object 4 worn by the user. When one of the characteristic regions 23 is moved and overlapped with at least one of the interactive object images 21, an interactive instruction is considered to be executed. The interaction set by the interactive object image 21 refers to the corresponsive movement. In FIG. 3, the interactive object image 21 produces a corresponsive movement change according to the interactive instruction executed by the controllable object image 22, so as to achieve the interactive effect.

While the invention has been described by means of specific embodiments, numerous modifications and variations could be made thereto by those skilled in the art without departing from the scope and spirit of the invention set forth in the claims.

What is claimed is:

1. An augmented reality man-machine interactive system, comprising:
   an image capturing device for capturing an image;
   a processing device coupled to the image capturing device and having at least one interactive object image and at least one controllable object image defined therein, and a plurality of interactive states set therein, and the controllable object image having at least one interactive instruction, and the interactive object image being dependent and controllable by the interactive instruction to switch the interactive state, and the processing device having at least one target color identification value, the processing device analyzing an image captured by the image capturing device, and when the image captured by the image capturing device has a color block corresponsive to the target color identification value, a range of the image having the color block is defined as a characteristic region, such that the controllable object image is dependent and controllable by the characteristic region, and at least one of the interactive instructions is executed according to the characteristic region, the processing device corrects a light intensity of the captured image according to an ambient light intensity before analyzing whether or not the image has the color block corresponsive to the target color identification value when the processing device receives the image captured by the image capturing device, and wherein when the captured image includes the color block corresponsive to the target color identification value, the processing device corrects a light intensity of the color block corresponsive to the color identification value along with a remainder of the image; and
   a projection device coupled to the processing device, the projection device projects the interactive object image, the controllable object image and the characteristic region for display.

2. The augmented reality man-machine interactive system according to claim 1, further comprising at least one label object, the label object having at least one color corresponsive to the target color identification value, the target color identification value being predefined in the processing device as an interval of color identification values, and the image capturing device capturing an image of the label object, so that the processing device defines the characteristic region.

3. The augmented reality man-machine interactive system of claim 2, wherein the label object is a wearable object.

4. The augmented reality man-machine interactive system according to claim 1, wherein the controllable object image is an image of user.

5. The augmented reality man-machine interactive system according to claim 1, wherein the processing device defines the interactive instruction according to an overlap of at least one of the characteristic regions and at least one of the interactive object images.

6. The augmented reality man-machine interactive system according to claim 1, wherein the processing device includes a wireless signal link and is a computer, a tablet PC, or a smart device.

7. The augmented reality man-machine interactive system according to claim 6, wherein the image capturing device includes a wireless signal link for communication with the processing device and is a camera device or a smartphone.

8. The augmented reality man-machine interactive system according to claim 6, wherein the projection device includes a wireless signal link and wirelessly receives signals from processing device and projects an augmented reality image responsive thereto.

9. An augmented reality man-machine interactive system, comprising:
   an image capturing device for capturing an image;
   a processing device coupled to the image capturing device and having at least one interactive object image and at least one controllable object image defined therein, and a plurality of interactive states set therein, and the controllable object image having at least one interactive instruction, and the interactive object image being dependent and controllable by the interactive instruction to switch the interactive state, and the processing device having at least one color identification value set defined by an interval of color identification values, the processing device analyzing an image captured by the image capturing device, and when the image captured by the image capturing device has a color block corresponsive to a color value within the color identification value set, the range of the image having the color block is defined as a characteristic region, such that the controllable object image is dependent and controllable by the characteristic region, and at least one of the interactive instructions is executed according to the characteristic region; and
   a projection device coupled to the processing device, the projection device projects the interactive object image, the controllable object image and the characteristic region for display.

10. The augmented reality man-machine interactive system according to claim 9, wherein the processing device corrects a light intensity of the image according to an ambient light intensity before analyzing whether or not the image has the color block corresponsive to a color value within the color identification value set, when the processing device receives the image captured by the image capturing device, and wherein when the image includes the color block corresponsive to a color value within the color identification value set, the processing device corrects a light intensity of the color block corresponsive to the color value within the color identification value set along with a remainder of the image.

\* \* \* \* \*